United States Patent [19]

Hamana et al.

[11] Patent Number: 4,894,737

[45] Date of Patent: Jan. 16, 1990

[54] MAGNETIC HEAD APPARATUS HAVING PROJECTIONS EXTENDING FROM AT LEAST A FRONT SIDE THEREOF

[75] Inventors: Junji Hamana, Hanno; Shinichi Hara, Fukaya; Makoto Miyagi, Chichibu, all of Japan

[73] Assignee: Canon Kabushiki Kaisha, Tokyo, Japan

[21] Appl. No.: 127,947

[22] Filed: Dec. 2, 1987

[30] Foreign Application Priority Data

| Dec. 5, 1986 | [JP] | Japan | 61-UM186790[U] |
| Dec. 12, 1986 | [JP] | Japan | 61-294732 |
| Dec. 25, 1986 | [JP] | Japan | 61-UM198483[U] |
| Jan. 23, 1987 | [JP] | Japan | 62-012214 |
| Jul. 31, 1987 | [JP] | Japan | 62-189989 |

[51] Int. Cl.⁴ .................. G11B 15/60; G11B 5/105
[52] U.S. Cl. ................. 360/130.21; 360/129; 360/130.31
[58] Field of Search .......... 360/130.21, 130.2, 130.3, 360/128, 129, 122, 130.31, 130.33

[56] References Cited

FOREIGN PATENT DOCUMENTS

| 1124253 | 2/1960 | Fed. Rep. of Germany | 360/130.21 |
| 0150126 | 11/1980 | Japan | 360/122 |
| 0106057 | 6/1985 | Japan | 360/130.31 |
| 0013465 | 1/1986 | Japan | 360/130.21 |
| 0134909 | 6/1986 | Japan | 360/130.21 |
| 0200458 | 11/1986 | Japan | 360/130.21 |
| 0192906 | 8/1987 | Japan | 360/122 |

Primary Examiner—Stuart N. Hecker
Assistant Examiner—David J. Severin
Attorney, Agent, or Firm—Fitzpatrick, Cella, Harper & Scinto

[57] ABSTRACT

This invention proposes to form a pair of protruding or projecting stripe portions along the tape-gliding face of magnetic tape and to reduce the pad pressure to magnetic tape thereby reducing the gliding resistance of magnetic tape without increasing its spacing loss (first embodiment), to incline the plane of the projecting stripe portions in a decreasing direction in the vicinity of the tape-gliding face in order to stabilize the pad contact (second embodiment), to form grooves on the tape-gliding face of the magnetic core in the transversal edge portions at least in the tape entrance side thereby facilitating prevention of tape squeaking (third embodiment), to increase the height of one of the projecting stripe portions in the vicinity of head mounting position compared to that of the other stripe portion thereby preventing one-sided abrasion of the tape-gliding face (fourth embodiment), and to form tape guide members on the magnetic head for guiding the magnetic tape closer to one of the projecting stripe portion at the head mounting position and separate from the other thereby preventing one-sided abrasion of the tape-gliding face (fifth embodiment).

16 Claims, 11 Drawing Sheets

MAGNETIC HEAD APPARATUS HAVING PROJECTIONS EXTENDING FROM AT LEAST A FRONT SIDE THEREOF

BACKGROUND OF THE INVENTION

1. Field of the Invention

The present invention relates to a magnetic head for use in combination with a cassette having a tape pressure pad for making gliding contact with a tape-gliding face, and more particularly to a magnetic head having a pair of projecting stripe portions for reducing the contact pressure of said tape pressure pad.

2. Related Background Art

Among such magnetic head there is for example known a magnetic head for recording and reproducing audio analog signals in a cassette tape recorder, of a general structure as shown in FIG. 1.

In FIG. 1, each of magnetic cores 12 has a magnetic gap 14 at a front end face thereof, and is provided with an unrepresented coil at an unrepresented rear portion. Said magnetic cores 12 are fitted in a shield case 15, and are fixed by a fixing material 13 such as epoxy resin to constitute a magnetic head 1.

The upper face of the shield case 15 in the drawing constitutes a magnetic tape-gliding face (hereinafter written as gliding face) 10 to be in gliding contact with an unrepresented magnetic tape, and the front end faces of the magnetic cores 12 are exposed, on said gliding face, in an aperture 15a formed in the shield case 15.

Tape guide members 2, 2 for guiding the magnetic tape are fixed on the lateral sides of the shield case 15 at the tape entrance and exit sides of the gliding face 10, and a head mounting plate 30 is fixed to the bottom face of the shield case 15.

The magnetic head 1 of the above-explained structure is placed, at recording and playback in a cassette tape recorder as shown in FIG. 2, in gliding contact with a magnetic tape 3 of a tape cassette 9.

At the recording and playback operation, the gliding face 10 of the magnetic head 1 projects, as shown in FIG. 2, by a projection height H from a linearly extended position of the magnetic tape 3, represented by a broken line. Said projection height H is defined as 1.8±0.5 mm according to the IEC standards.

In the magnetic tape cassette 9, a pad 6 elastically supported by a pad spring 5 is positioned opposite to the magnetic head 1 and resiliently presses the magnetic tape 3, by means of the elastic force of said pad spring 5, toward the gliding face 10 of the magnetic head 1, in order to prevent the spacing loss caused by the gap between the magnetic tape 3 and the magnetic core 12. Such pressure contact state is shown in FIG. 3, representing a cross sectional view along a line a—a' in FIG. 1. Said pad 6 has a width of at least 5.00 mm according to said standards, larger than the width 3.81+0−0.05 mm of the magnetic tape 3, and is composed of a rectangular block for example of felt.

Rotation of a capstan 8 and a take-up reel 4 of the recorder as indicated by arrows pulls out the magnetic tape 3 from an unrepresented unwinding reel at the right-hand slide of the tape cassette 9, whereby the tape 3 glides over the magnetic head 1 and is then taken up on the reel 4 as indicated by arrows. A pinch roller 7 is provided for maintaining the magnetic tape 3 in contact with the capstan 8.

During said gliding contact, the magnetic head 1 executes a magnetic recording on or a magnetic playback from the magnetic tape 3.

FIG. 4 shows another conventional structure of the magnetic head 1 disclosed in the Japanese Utility Model Laid-open No. 12704/1975, portions 16a–16d for defining the running position of the magnetic tape are extendedly formed, instead of the tape guide members 2, along the gliding face 10 of the magnetic head 1 in the integral manner.

At the internal rims of the connecting portions of said defining portions 16a–16d, there are formed recesses 17, 18 for accepting the above-mentioned pad 6. Consequently, also in this magnetic head 1, the pressure contact of the magnetic tape to the gliding face 10 by the pad 6 is achieved in the same manner as in FIG. 3.

However, in the above-explained mechanisms, it is increasingly requested to reduce the torque T required for winding the magnetic tape 3 in gliding contact with the magnetic tape 1, in order to decrease the power consumption of the tape driving mechanism.

For this purpose it has been proposed, for example, to include a lubricating material in the fixing material 13 in the head structure shown in FIG. 1 for reducing the friction coefficient of the gliding face 10, but sufficient effect has not been obtained.

FIG. 5 is a chart showing the torque T required for winding the magnetic tape 3 as a function of the projection height H of the magnetic head 1, when it is in gliding contact with the magnetic tape 3 of the cassette 9 as shown in FIG. 2. A line 19A indicates the behavior under pressure contact with the pad 6, while a line 19B shows the behavior without said pad. The measurement was conducted with a torque gage in an atmosphere of temperature of 25° C. and relative humidity of 50%.

As will be apparent from FIG. 5, the torque T is proportional to the head projection H as indicated by the line 19A in the presence of pressure contact by the pad 6, but is almost constant regardless of the head projection H in the absence of the pad 6, as shown by the line 19B.

Since the contact pressure of the magnetic tape 3 to the magnetic head 1 by the pad 6 increases with the projection height H of the head 1, the torque is apparently dependent on the contact pressure of the pad 6 and becomes larger as said pressure increases.

Consequently, the torque T of the magnetic tape 3 can be decreased by reducing the contact pressure of the pad 6.

In relation to this fact, the U.S. Pat. No. 3,777,070 and the Japanese Utility Models Laid-open No. 21022/1974, 36922/1974, 131919/1974 and 7422/1975 proposed, as shown in FIG. 6, a structure in which a pair of projecting portions 20, 20 are formed on the gliding face 10 of the magnetic head 1, on both sides of the gliding area of the magnetic tape 3, whereby the pad 6 engages at both lateral ends thereof with said projecting portions 20, 20 and is not pressurized to but separated from the magnetic tape 6. The U.S. Pat. No. 3,777,070 disclosed such structure for a magnetic head for recording and reproducing digital signals, while the Japanese Utility Model Laid-open No. 36922/1974 disclosed a structure for a Hall element.

However, such structure in which the magnetic tape 3 is not under pressure contact, gives rise to a spacing loss though it can reduce the torque. The spacing loss is not a serious problem in a magnetic head for digital signals or a Hall element, but is an important drawback for the magnetic head for recording and playback of audio analog signals, particularly in the faithful recording and playback of delicate changes in the audio wave forms. This will be referred to as a first drawback.

Then, as explained in relation to FIG. 2, the magnetic tape 3 runs in the cassette 9 with gliding contact with the gliding face 10 of the magnetic head 1.

In such structure, therefore, the adhesive material of the magnetic tape 3, such as binder, sticks to the gliding face 10 of the magnetic head 1 in the course of gliding movement of the tape on the head 1, thereby inducing a loss in the head output. Said adhesive material at first adheres to the fixing material 13 of the gliding face 10, and then spreads to the area of magnetic cores 12, thus inducing the loss in the head output. Particularly under a condition of high temperature and high humidity, for example encountered by a magnetic head for automobile use, the deposition of the adhesive material is accelerated, causing an output loss of 3 dB or more for example by tape running as short as about 10 hours.

It has therefore been proposed, as shown in FIG. 7, to form grooves 28, 28 along both sides of the magnetic cores 22 at the entrance and exit sides of the gliding face 26, thereby removing the fixing material 24 in the positions of said grooves.

However, such structure, though effective for preventing the deposition of the adhesive material, increases the abrasion of the magnetic cores 22 as the pressure of the pad 6, for pressing the magnetic tape against the gliding face 26, is concentrated on the magnetic cores 22. For example the abrasion amounts to 30 μm or more in a tape running of about 200 hours. Such abrasion gives rise to a spacing loss, indicing a loss in the heat output.

FIG. 8 is a chart showing the abrasion of the magnetic core 22 as a function of the head projection height H in the tape gliding state shown in FIG. 2, indicating that the magnitude of abrasion is dependent on the pad pressure. The amount of abrasion was measured with a surface coarseness meter after a tape running of 200 hours under 40° C. and 70% RH.

As shown in FIG. 8, the abrasion rapidly increases with the increase of the head projection H beyond 1.0 mm. This result indicates a fact that the abrasion is dependent on the pad pressure, as said pressure increases at a large head projection H. This point will be referred to as a second drawback.

In a recording-playback apparatus such as a cassette tape recorder, a tape driving system as shown in FIG. 9 is employed for maintaining the magnetic tape in gliding contact with the magnetic head.

In FIG. 9, a magnetic head 1 is mounted, by a mounting plate 30, on an unrepresented main body of the cassette tape recorder. The tape cassette 9 shown in FIG. 2 is loaded on this tape driving system. In FIGS. 2 and 9, there is shown a capstan 8 for driving the magnetic tape 3 at a constant speed. Said capstan 8 is fixed to a socket 32 integral with a flywheel 31 which is driven by a motor 34 through a belt 34, and a uniform rotating speed is obtained by the inertia of said flywheel 31.

A rubber pinch roller 7 maintains the magnetic tape 3 in pressure contact with the capstan 8.

At the recording or playback operation, the magnetic head 1 as shown in FIG. 2 is advanced by a predetermined amount into the interior of the tape cassette 9, thereby pressing the pad 6 across the magnetic tape 3. The pad spring 5 exhibits elastic deformation, and the resulting elastic force causes the pad 6 to press the magnetic tape 3 to the gliding face 10 of the magnetic head 1. Since the surface of the pad 6 is formed parallel to the gliding face 10, the pressure of the pad 6 is substantially uniform over the surface thereof.

Rotation of the capstan 8 indicated by an arrow, caused by the motor 33, in contact with the pinch roller 7 with the magnetic tape 3 sandwiched therebetween, advances the magnetic tape 3 as indicated by an arrow with gliding contact with the gliding face 10 of the magnetic head 1, thus achieving a recording or blackback operation. Simultaneously the take-up reel 4 is rotated by unrepresented driving means to wind the magnetic tape 3.

In such magnetic head for a cassette tape recorder, in order to reduce the torque required for the magnetic tape 3 and the frictional abrasion of the magnetic head, it is already proposed to form a pair of projecting stripe portions on the gliding face 10, for contacting the end portions of the pad 6 exceeding the sides of the magnetic tape, thereby reducing the contact pressure of the pad 6.

In the above-explained structure, the sandwiching pressure on the magnetic tape 3 between the capstan 8 and the pinch roller 7 is not transversally uniform but is stronger toward the socket 32, since the capstan 8 is supported at one side only. Consequently the traction force on the magnetic tape 3 is stronger at the side closer to the socket 32 in the transversal direction, and the tension of the magnetic tape 3 shows a similar distribution.

The abrasive force of the magnetic tape 3 on the gliding face 10 of the magnetic head 1 is represented by the sum of the contact pressure of the pad 6 and the tension of the tape 3. Therefore, even if the contact pressure of the pad 6 is uniform as explained above, the gliding face 10 causes one-sided abrasion if the tension of the tape is not uniform. In fact the abrasion of the gliding face 10 becomes larger at the side of the socket 32. Such uneven abrasion increases the spacing loss, thus eventually shortening the service life of the magnetic head 1, and this fact will be referred to as a third drawback.

SUMMARY OF THE INVENTION

A first object of the present invention, for resolving the aforementioned first drawback, is to reduce the contact pressure of the pad by means of a pair of projecting stripe portions thereby reducing the torque required for the tape and the abrasion of the gliding face of the magnetic head, while maintaining the pad in pressure contact with the magnetic tape with a required contact pressure thereby suppressing the spacing loss, as will be seen in first and second embodiments to be explained later.

A second object of the present invention, for resolving the aforementioned second drawbacks, is to form the above-mentioned paired projecting stripe portions on the gliding face of the magnetic head and a groove along the edge portion of said gliding face at the tape entrance side thereof, thereby preventing the deposition of adhesive substance to the magnetic core as the result of tape running, as will be seen in a third embodiment to be explained later.

A third object of the present invention, for resolving the aforementioned third drawback, is to modify the height of the projecting portions on the gliding face of the magnetic head and/or the tape position thereon, in order to significantly reduce the pad pressure at a side where the magnetic tape has a higher tension, thereby making the sum of the pad pressure and the tape tension uniform in the transversal direction, thus preventing one-sided abrasion of the gliding face, and providing larger positional tolerances to the projecting stripe portions, as will be seen in fourth and fifth embodiments to be explained later.

DETAILED DESCRIPTION OF THE PREFERRED EMBODIMENTS

At first there will be explained a first embodiment of the present invention, with reference to FIGS. 10 to 14.

Figure 1:
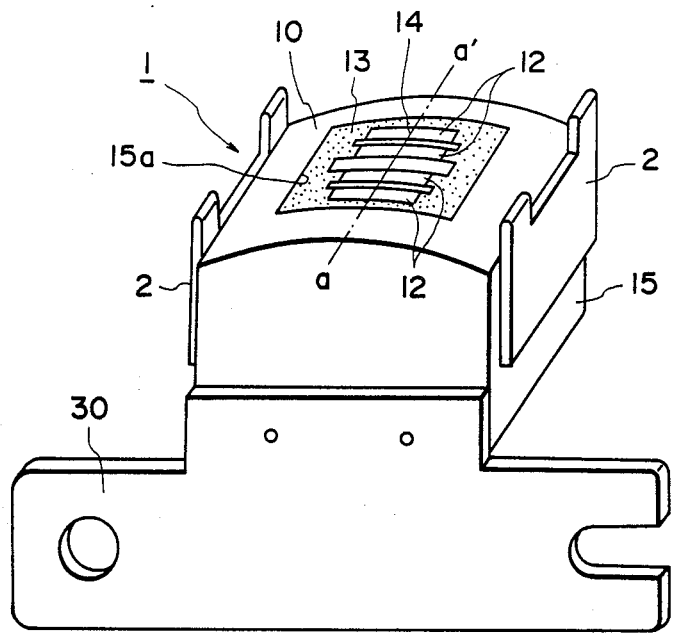
FIG. 1 is a perspective view of a conventional magnetic head.
Figure 10:
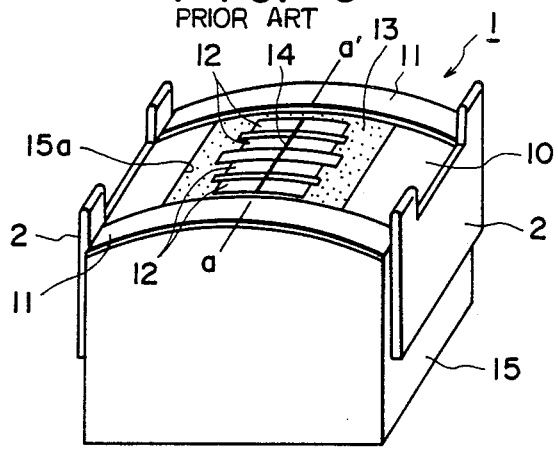
FIG. 10 is a perspective external view of a magnetic head constituting a first embodiment of the present invention.

FIG. 10 shows a magnetic head, constituting a first embodiment of the present invention, for recording and playback of audio analog signals in a cassette tape recorder, as in the conventional head shown in FIG. 1. In FIG. 10, same components as those in FIG. 1 are represented by same numbers, and will be omitted from the following explanation (mounting plate 30 being omitted from the drawing).

The magnetic head 1 of the present embodiment is provided, in addition to the structure of the conventional head shown in FIG. 1, with projecting stripe portions 11, 11 on the gliding face 10 or upper face of the shield case 15, as a structure featuring the present invention. More specifically the projecting stripe portions 11, 11 are placed on both sides of the aperture 15a of the gliding face 10 where the magnetic cores 12 are exposed, so as to sandwich the tape gliding area of the gliding face 10, and are extended over the entire length of the gliding face 10 along the lateral edges of the magnetic tape running area defining a substantially rectangular area on the gliding face 10. The projecting stripe portions 11, 11 are mutually so spaced that they do not touch the edges of the magnetic tape but are separated therefrom by predetermined gaps l (see FIG. 11).

Figure 11:
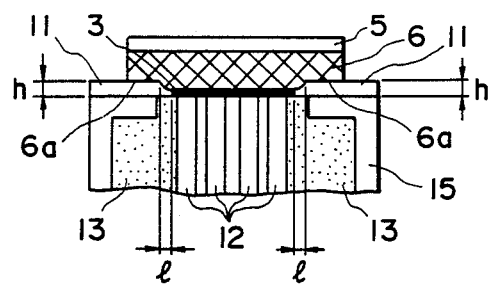
FIG. 11 is a cross-sectional view along a line a—a' in FIG. 10 under pad contact.

In the tape running state for recording or playback of audio analog signals, as shown in FIG. 11 representing a cross section along a line a—a' in FIG. 10, the pad 6 for pressing the magnetic tape 3 against the gliding face 10 touches the projecting stripe portions 11, 11 in end portions 6a, 6a overflowing the tape 3. The projecting stripe portions 11, 11, being extended along the tape running direction, contacts the end portions 6a, 6a of the pad 6 in linear areas.

In the present embodiment where the projecting stripe portions 11, 11 are in contact with the end portions 6a, 6a of the pad 6, said portions 11, 11 presses the pad 6 in a direction away from the gliding face 10, thereby reducing the contact pressure of the pad 6 pressing the tape 3 against the gliding face 10. This reduced pressure decreases the torque T required for taking up the magnetic tape 3 as explained above, and also decreases the time-dependent abrasion of the gliding face caused by friction with the magnetic tape 3.

The above-explained advantages will be clarified in more detail in the following.

Figure 5:
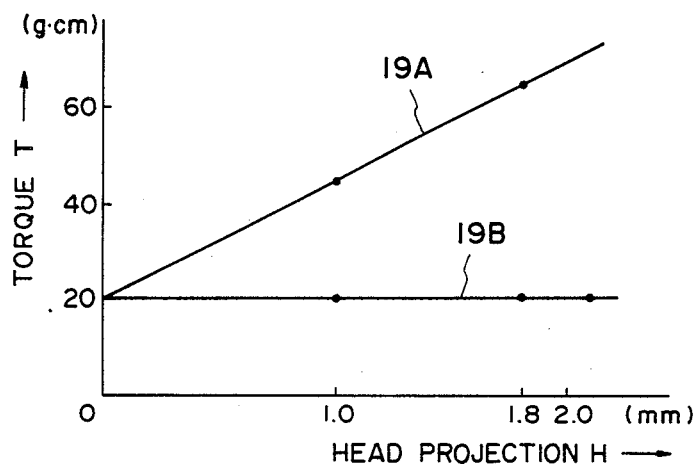
FIG. 5 is a chart showing the relationship between the projection height H of the magnetic head in FIG. 2 and the torque T.
Figure 12:
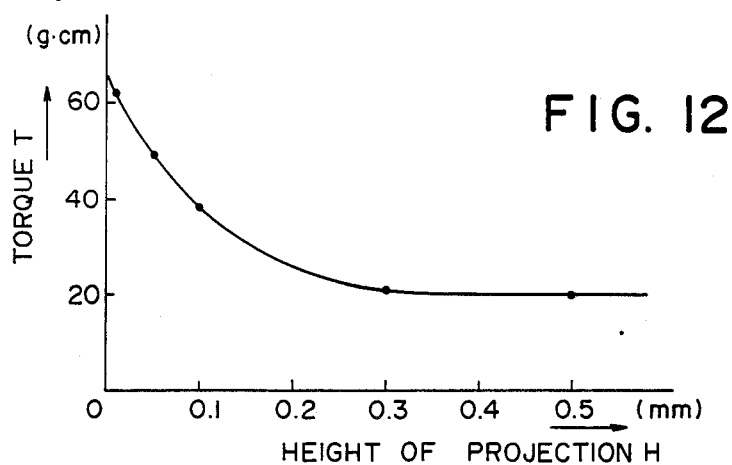
FIG. 12 is a chart showing the relationship between the height of projecting stripe portions in FIGS. 10 or 11 and the torque required for the magnetic tape.

FIG. 12 shows the driving torque T required for the magnetic tape 3, as a function of the height h of the projecting stripe portions 11, 11 from the gliding face 10 (see FIG. 11), in the head structure shown in FIG. 10. The measurement was conducted in the same manner as in case of FIG. 5, with a torque gage under a condition of 25° C. and 50% RH. The projection H of the magnetic head 1 was maintained constant at 1.8 mm.

As will be apparent from FIG. 12, the driving torque T is significantly reduced if the height h exceeds 0.1 mm, in comparison with the case of zero height corresponding to the conventional magnetic head.

Figure 13:
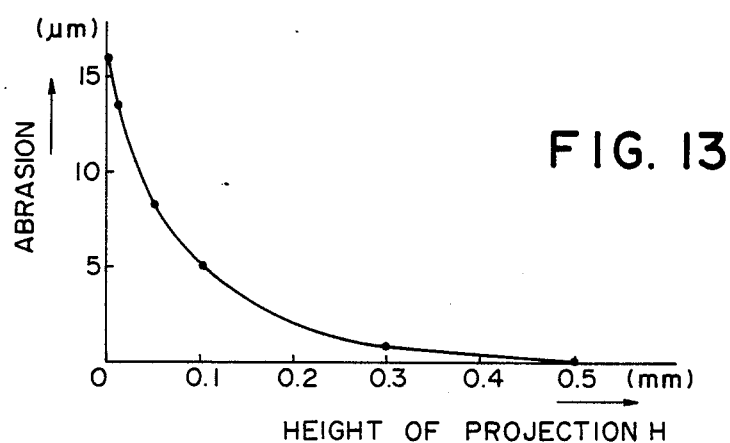
FIG. 13 is a chart showing the relationship between the height of projecting stripe portions and the depth of abrasion of the gliding face.

FIG. 13 shows the depth of abrasion of the gliding face 10 as a function of the height h of the projecting stripe portions. The depth of abrasion was measured at the magnetic core 12 in the gliding face 10 shown in FIG. 10 after tape running for 200 hours at a speed of 4.76 cm/sec at 40° C. and 70% R.H.

As will be apparent from FIG. 13, the depth of abrasion decreases significantly when the height h exceeds 0.1 mm, in comparison with the case of zero height corresponding to the conventional magnetic head.

In this manner the presence of the projecting stripe portions of a height equal to or larger than 0.1 mm can significantly decrease the driving torque T and the abrasion of the gliding face 10.

Figure 6:
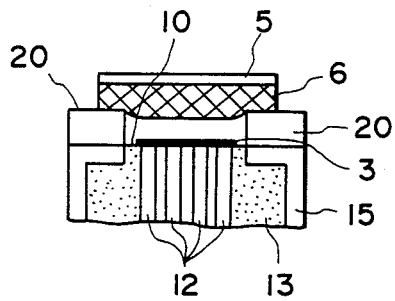
FIG. 6 is a cross-sectional view of still another conventional magnetic head, corresponding to FIG. 3.

However, an excessively large height h of the projecting stripe portions 11 will result in a spacing loss as in the conventional head shown in FIG. 6.

In the present embodiment therefore, the height h of the projecting stripe portions 11 from the gliding face 10 and the gap l to the magnetic tape 3 are so selected that the pad 6 can press the magnetic tape 3 over the entire width thereof with a suitable pressure necessary for preventing the spacing loss.

Figure 14:
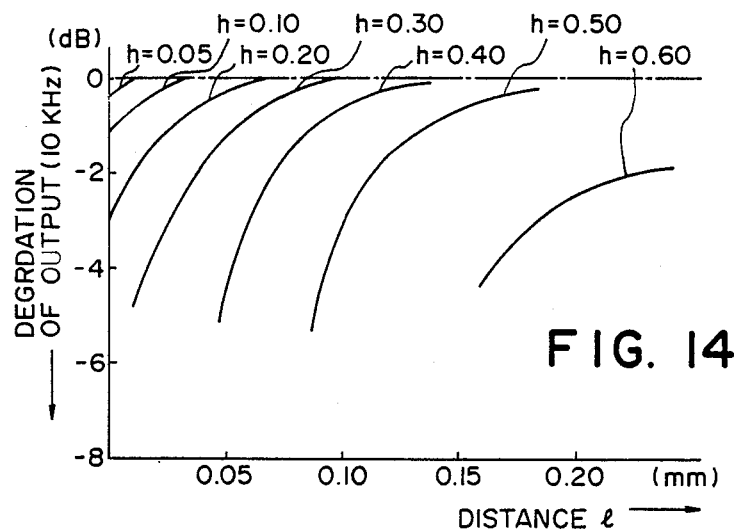
FIG. 14 is a chart showing the relationship among the height of projecting stripe portions, spacing to the magnetic tape and playback output loss.

FIG. 14 shows the data required for determining such suitable height h and gap l of the projecting stripe portions 11. More specifically it shows the loss in the playback output of a 10 KHz signal recorded at a predetermined level in a cassette tape, at various height h and gaps l in the magnetic head structure shown in FIGS. 10 and 11, in comparison with a case lacking such projecting stripe portions, measured under a condition of 25° C. and 50% R.H. In a 4-channel head shown in FIG. 10, the output loss varies depending on the channel and is larger at channels close to the projecting stripe portions. In FIG. 14 there are shown maximum loss values among four channels. In this measurement the projection H of the magnetic head was maintained constant at 1.8 mm.

As will be apparent from FIG. 14, there is observed a significant deterioration in the electromagnetic conversion characteristic resulting from the spacing loss, leading to a level fluctuation in the recording and playback of audio analog signals, when the height h becomes equal to or larger than 0.6 mm. Even when the height h is equal to 0.6 mm, the deterioration in the electromagnetic conversion characteristic cannot be avoided though the pad partially touches the magnetic tape. Also said deterioration is unavoidable unless the gap l is sufficiently large, even if the height h is less than 0.50 mm.

The data shown in FIGS. 12, 13 and 14 indicate that, for reducing the driving torque and the abrasion and suppressing the deterioration in the characteristic resulting from the spacing loss, the height h is preferably selected at least equal to 0.01 mm and not exceeding 0.50 mm, and the gap l is preferably selected at least ¼ of the height h. Selection of the gap l in this manner allows sufficient deformation of the pad 6, thereby enabling to press the magnetic tape 3 to the magnetic gap of a channel (magnetic core 12) adjacent to the projecting stripe portion, with a desired contact pressure.

The gliding position of the magnetic tape 3 on the gliding face 10 is defined by the tape guide members 2, 2, so that the width of the gliding area of the magnetic tape 3 in the vicinity of the magnetic gaps is substantially equal to the standard width $3.82^{+0.05}_{-0}$ mm of said tape guide members 2. In consideration of this fact and of the standard pad width of at least 5.00 mm, the gap l should preferably not exceed 0.4 mm in order that the end portions of the pad 6 always ride stably the projecting stripe portions 11, 11.

Also the projecting stripe portions 11 should have a length of at least 1 mm in the tape running direction in order that the pad 6 can stably ride thereon.

In addition the projecting stripe portions 11 should be formed in a pair as shown in FIGS. 10 and 11, as a single stripe portion results in an unbalanced pressure contact of the pad 6, hindering smooth movement of the magnetic tape.

As explained in the foregoing, it is rendered possible to reduce the driving torque and the abrasion by suitably selecting the height h of the projecting stripe portions 11, the gaps l thereof to the magnetic tape 3, and the length and number thereof in the tape running direction. Also satisfactory recording and playback can be achieved, since it is rendered possible to prevent the spacing loss affecting particularly the recording playback of audio analog signals.

Figure 4:
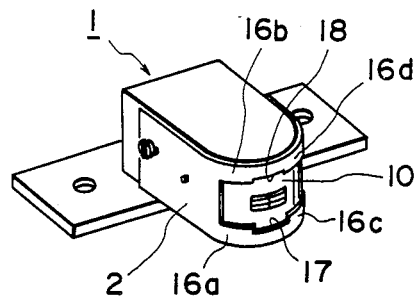
FIG. 4 is a perspective view showing another conventional magnetic head.

The projecting stripe portions 11, 11 in the present embodiment may look, in appearance, similar to the connected defining portions 16a–16d of the tape guide members 2 in the conventional magnetic head shown in FIG. 4, but are fundamentally different in the structure, function and advantage.

More specifically, the projecting stripe portions 11, 11 are primarily provided for reducing the contact pressure of the pad 6. On the other hand, the defining portions 16a–16d are provided, in the connecting portions thereof, with notches 17, 18 for accepting the pad and are therefore unable to reduce the contact pressure of the pad.

Also the projecting stripe portions 11, 11 do not touch the magnetic tape but have gaps l therefrom in order to maintain the pad in contact with a suitable pressure with the magnetic tape over the entire width thereof, while the defining portions 16a–16d contact with the magnetic tape for defining the same.

As detailedly explained in the foregoing, the first embodiment of the present invention provides, in a magnetic head for signal recording on or playback from a magnetic tape movable relative thereto and maintained in pressure contact by a pad, a structure having projecting stripe portions extended along the tape running direction on the tape gliding face of the magnetic tape and spaced from said magnetic tape in order to come into contact with the end portions of said pad thereby reducing the contact pressure thereof on the magnetic tape, wherein the height of said projecting stripe portions from said gliding face and the gaps thereof from the magnetic tape are so selected that said pad can press the magnetic tape with a required pressure, thereby reducing the driving torque of the magnetic tape without deterioration in the electromagnetic conversion characteristic of the head resulting from the spacing loss, thereby enabling to economize the power consumption in the tape driving unit of magnetic record-playback apparatus, and also improving the abrasion resistance of the magnetic head.

Figure 15:
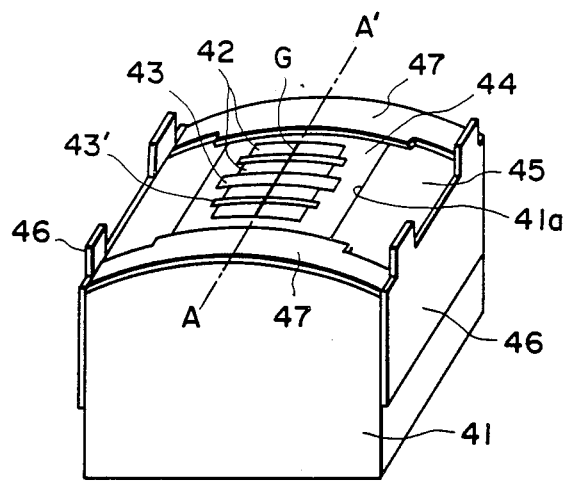
FIG. 15 is a perspective external view of a magnetic head constituting a second embodiment of the present invention.

FIG. 15 shows a 4-channel auto-reverse audio magnetic head constituting a second embodiment of the present invention. Following explanation will omit the structure common with the conventional head shown in FIG. 1 and will concentrate on the areas different from the conventional structure.

In FIG. 15, the magnetic head of the present embodiment is provided, in addition to the structure of the conventional head shown in FIG. 1, with projecting stripe portions 47, 47 on a tape gliding face 45, constituting the upper face of a shield case 41. More specifically said projecting stripe portions 47, 47 are positioned on both sides of an aperture 41a of the gliding face 45 where magnetic cores 42 are exposed, sandwiching a tape gliding area of the gliding face 45 and extended over the substantially entire length of the substantially rectangular gliding face 45, when seen from above, along two lateral edges parallel to the tape running direction.

Figure 16:
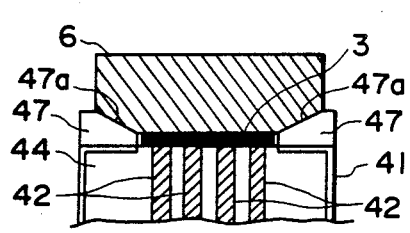
FIG. 16 is a cross-sectional view of said head along a line A—A' in FIG. 15 under pad contact.
Figure 17:
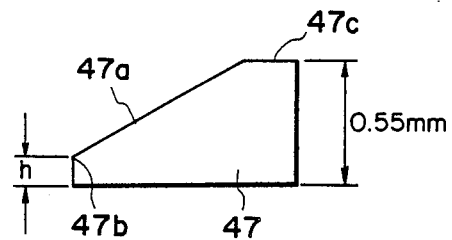
FIG. 17 is a schematic view of cross-sectional form of the projecting stripe portion in FIGS. 15 and 16.

The stripe portions 47, 47 are formed wider in the central portion adjacent to the aperture 41a, than at the end portions. As shown in FIGS. 16 and 17, indicating the cross-section along a line A—A' in FIG. 15, the central portion of the stripe portion 47 has a substantially wedge form, having an inclined face 47a with a gradually decreasing height from the gliding face 45 toward the gliding area of the magnetic tape 3, except an external upper face of a predetermined width.

In the recording or playback operation with the magnetic head of the present embodiment, the magnetic tape 3 is pressed against the gliding face 45 by the elastic pad 6 as shown in FIG. 16. Said pad 6, having a rectangular original form, is deformed by contact in the portions overflowing the magnetic tape 3, with the inclined faces 47a of the stripe portions 47, and is maintained in pressure contact in the central area with the magnetic tape 3.

In this state said inclined faces 47a press the pad 6 in relative manner to reduce the contact pressure of the pad 6 on the magnetic tape, thereby reducing the driving torque for the magnetic tape 3 and the abrasion of the gliding face 45.

Figure 18:
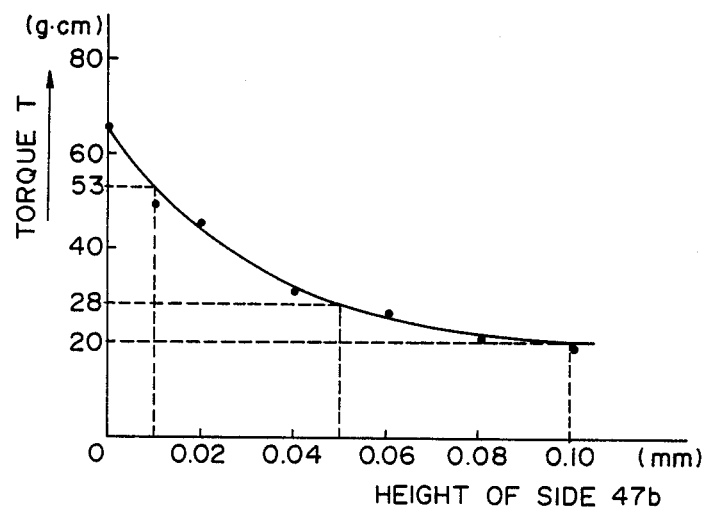
FIG. 18 is a chart showing the relationship between the height h of an end rim of the projecting portion shown in FIG. 17 and the torque T of the magnetic tape.

FIG. 18 shows the driving torque required for the magnetic tape, as a function of the height of the inclined face 47a from the gliding face 45. More specifically, as shown in FIG. 17, the height of the top face 47c of the stripe portion 47 from the gliding face 45 was maintained constant at 0.55 mm, and the height of the inclined face 47a at the edge 47b closer to the tape gliding area was varied in a range of 0–0.1 mm.

As can be seen in FIG. 18, the effect of driving torque reduction starts to appear at a height h=0.01 mm of the edge 47b to provide a driving torque T=53, and the torque is further reduced at a larger height h, as indicated by T=28 at h=0.05 mm and T=20 at h=0.1 mm.

However a height larger than h=0.1 mm results in an insufficient deformation of the pad 6, so that the pad 6 cannot press the lateral areas of the magnetic tape 3 in the vicinity of the stripe portions 47, 47, thus generating a spacing loss in said areas to deteriorate the electromagnetic conversion characteristics and giving rise to unstable running of the magnetic tape 3.

Therefore, in order to suitably reduce the contact pressure of the pad 6 and to enable pressure contact of the pad 6 over the entire width of the magnetic tape 3 for avoiding the spacing loss, the height h is maintained in a range of 0.01 to 0.1 mm, preferably 0.05 to 0.1 mm.

In this manner the present embodiment is capable of reducing the driving torque T of the magnetic tape 3 and the abrasion of the gliding face 45 and preventing the spacing loss, thereby obtaining satisfactory electromagnetic conversion characteristics.

Also the projecting stripe portions 47, 47 of the present embodiment having inclined faces 47a, are capable of more effectively reducing the contact pressure of the pad 6 onto the magnetic tape 3, due to the presence of said inclined faces 47a, in comparison with flat stripe portions with a same height of the edge 47b.

Stated differently, even when the height h of the edge 47b of the stripe portion 47 is decreased to enable contact of the pad 6 over the entire width of the magnetic tape 3 with a necessary pressure, the presence of the inclined face 47a allows to sufficiently reduce the pad pressure.

Also since the height h of the edges 47b can be made small, said edges 47b of the stripe portions 47 can be positioned, on the gliding face 45, very close to the edges of the magnetic tape 3, as shown in FIG. 16. More specifically, the distance between the edges 47b of the stripe portions 47 can be substantially equal to the width of the tape guide member 46 ($3.82^{+0.05}_{-0}$ mm in case of a cassette tape), so that the running position of the magnetic tape 3 in the transversal direction can be defined by said projecting stripe portions 47, 47.

Therefore, this structure can restrict the running position of the magnetic tape 3 in the transversal direction in the area of magnetic cores 42 at the center of the gliding face 45, in order to securely prevent the error in the tape running position in the transversal direction, thereby preventing deterioration in the electromagnetic conversion characteristic, cross talk and damage in the tape, resulting from such positional error.

In the structure of the present embodiment, the inclined face 47a of the projecting stripe portion 47 may be formed, instead of an inclined flat plane as shown in FIG. 16 or 17, as a curved plane such as an arc.

Figure 19:
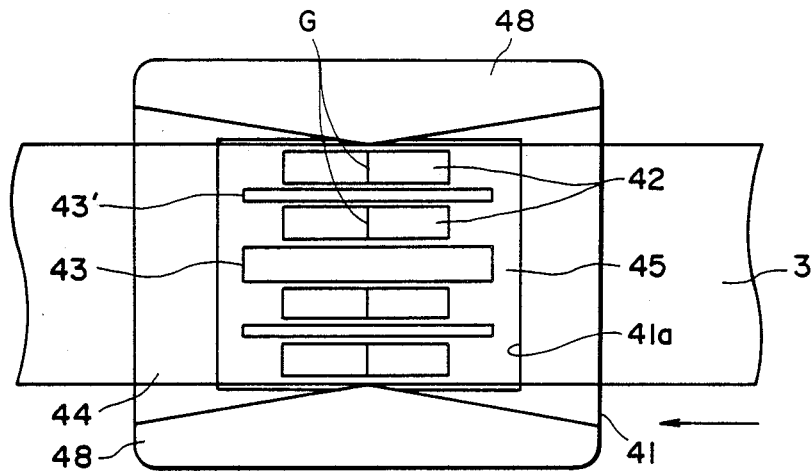
FIGS. 19 and 20 are front view of different variations of the second embodiment shown in FIG. 15.
Figure 20:
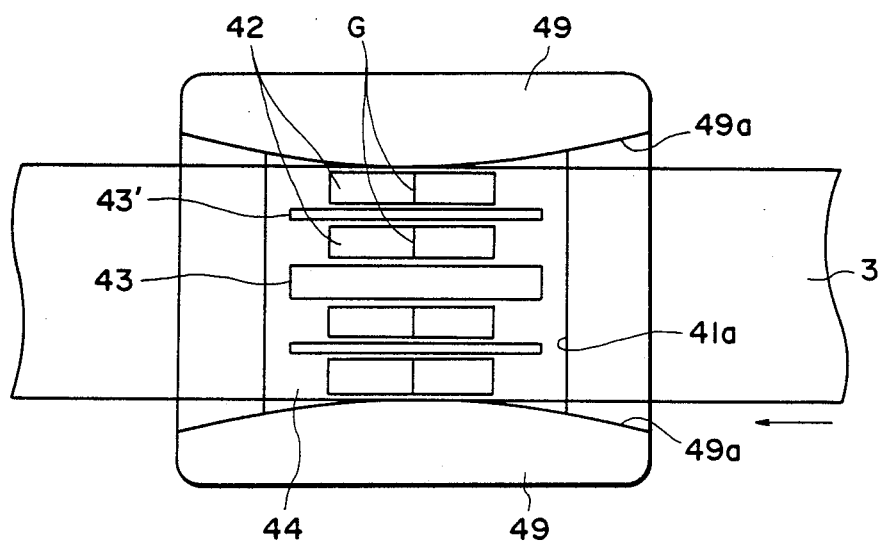

Also the form of the projecting stripe portions 47, 47, seen from above as shown in FIG. 15, is not limited to that shown in FIG. 15 but may assume other forms for example as shown in FIGS. 19 and 20, however always with a cross section shown in FIG. 16.

In an embodiment shown in FIG. 19, the projecting stripe portions 47, 47 are formed as portions 48 of substantially triangular form when seen above, with a largest width at the center neighboring the magnetic cores 42.

Also in an embodiment shown in FIG. 20, there are provided projecting stripe portions 49, 49 with arc-shaped internal edges 49a, 49a.

These embodiments can also achieve similar effects if the upper faces of the stripe portions 47–49 contacting the pad 6 are formed as inclined faces similar to the faces 47a in FIG. 16.

Also these stripe portions 47–49 may be formed integral with the tape guide members 46, 46.

Furthermore, the above-explained structures with the projecting stripe portions 47–49 are not limited to the heads explained in the present embodiment but are applicable, with similar advantages to any magnetic head for performing the recording or playback operation on a magnetic tape running relative to said head under pressure contact by a pad.

As detailedly explained in the foregoing, the second embodiment of the present invention provides, in a magnetic head having a gliding face for receiving a magnetic tape under pressure contact by a pad and projecting stripe portions positioned outside said gliding face for contacting the end portions of said pad, a structure in which said stripe portions serve to reduce the contact pressure of said pad and are provided with inclined pad-contacting faces with decreasing height toward said gliding face, whereby the reduction of pad pressure results in a reduction in the driving torque of the magnetic tape and in the abrasion of the gliding face. Also a suitable selection of the height of the pad-contacting inclined face of the stripe portions from the gliding face allows to contact the pad over the entire width of the magnetic tape, thereby preventing the spacing loss, and to restrict the running position of the magnetic tape in the transversal direction, thereby obtaining satisfactory electromagnetic conversion characteristics.

Figure 21:
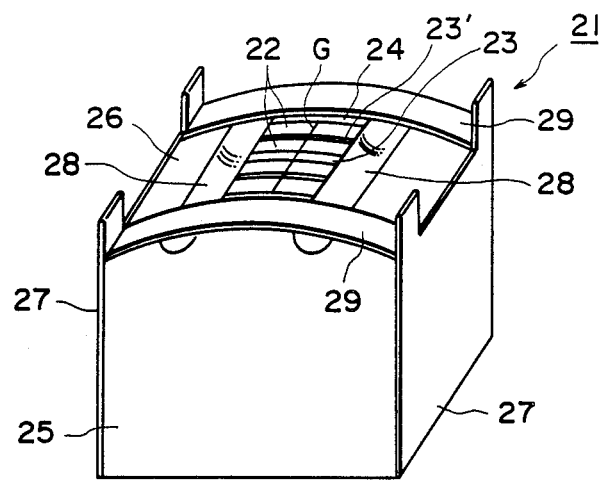
FIG. 21 is a perspective external view of a magnetic head constituting a third embodiment of the present invention.
Figure 22:
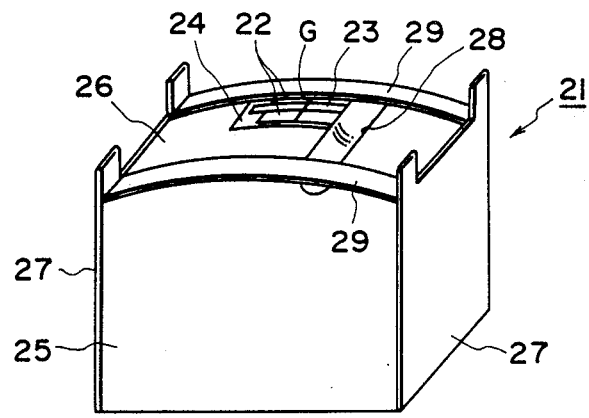
FIG. 22 is a perspective view showing a variation of the third embodiment shown in FIG. 21.

Now FIGS. 21 and 22 illustrate a third embodiment of the present invention.

Figure 7:
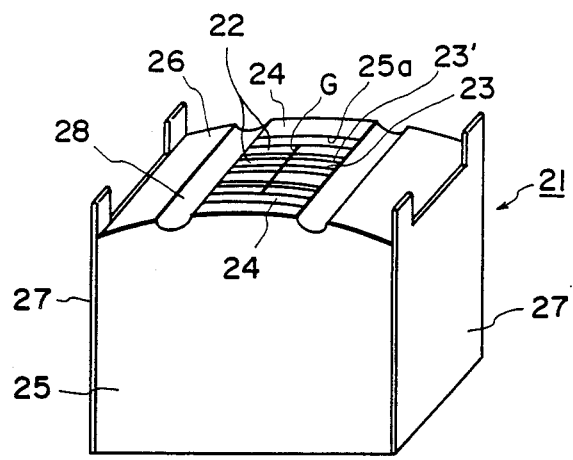
FIG. 7 is a perspective view of a conventional magnetic head having grooves on the gliding face.
Figure 8:
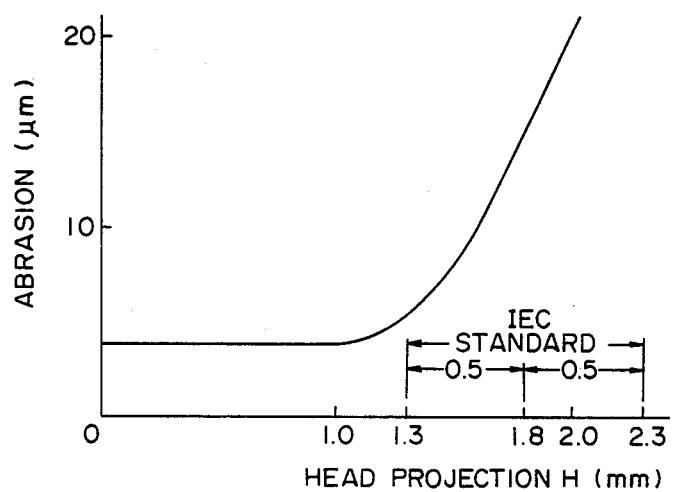
FIG. 8 a chart showing the relationship between the projection height H of the magnetic head in FIG. 2 and the amount of abrasion.

FIG. 21 illustrates a 4-channel auto-reverse magnetic head for use in a cassette tape recorder, corresponding to the conventional structures shown in FIGS. 1 and 7. In FIG. 21, same components as those in FIG. 7 are represented by same numbers and will be omitted from the following explanation.

A magnetic head 21 of the present embodiment shown in FIG. 21 is provided, in addition to the conventional structure shown in FIG. 1 as in the conventional structure shown in FIG. 7, with linear grooves 28, 28 of a predetermined width, positioned along the edges of magnetic cores 22 on a gliding face 26 at the entrance and exit sides of the magnetic tape, thereby eliminating the fixing material at the positions of said grooves.

In addition the present embodiment is provided with projecting stripe portions 29, 29 on the gliding face 26, constituting the upper case of a shield case 25. More specifically said stripe portions 29, 29 are positioned on both sides of an aperture 25a of the gliding face 26 where the magnetic cores 22 are exposed, thus sandwiching a tape gliding area on the gliding face 26, and are extended over the entire length of the gliding face 26 substantially rectangular when seen from above, along both lateral edges parallel to the tape running direction. The stripe portions 29, 29 do not touch the lateral edges of the magnetic tape but are spaced therefrom by predetermined gaps.

During tape motion for recording or playback operation, a pad 6 for pressing the magnetic tape 3 to the gliding face 26 is in contact, in linear areas at the end portions overflowing said magnetic tape 3, with the projecting stripe portions 29, 29 whereby the contact pressure of the pad 6 is reduced. Stated differently the stripe portions 29, 29 press, in relative manner, the pad 6 in a direction away from the gliding face 26, thereby reducing the contact pressure of said pad 6.

In this manner the present embodiment can prevent the deposition of adhesive substance to the magnetic cores 22 in the course of tape running, through the presence of the grooves 28, 28, and can reduce the contact pressure of the pad 6 by the presence of the projecting stripe portions 29, 29, thereby preventing the abrasion of the magnetic cores.

Excessively high stripe portions 27 (from the gliding face 26) are unable to reduce the contact pressure of the pad, while excessively high ones cannot achieve suitable pressing of the magnetic tape by the pad 6, thus resulting in a spacing loss, deteriorating the magnetic characteristic of the head, particularly the stability in the high frequency region.

In order to reduce the contact pressure of the pad, and still to realize a suitable contact pressure capable of preventing the spacing loss over the entire width of the magnetic tape, the height of the projecting stripe portions is preferably maintained from 0.01 mm to 0.5 mm. Also the stripe portions 29, 29 are separated by gaps from the lateral edges of the magnetic tape when contacting the pad 6, as explained before, and said gaps are preferably selected equal to or larger than $\frac{1}{4}$ of the height of said stripe portions 29 in order to obtain necessary contact pressure over the entire width of the magnetic tape.

Also in order to prevent the deposition of adhesive substance, the grooves 28 should have a depth at least equal to 0.1 mm so that the bottom thereof does not touch the magnetic tape. Also the grooves 28 should have a width at least equal to 0.5 mm in the tape running direction, since a width smaller than 0.5 mm will inversely facilitate the deposition of the adhesive substance. Furthermore the grooves 28 should have a length at least covering the lateral edges of the magnetic cores.

In this manner suitable selection of the height of the stripe portions 29, 29, gaps thereof to the magnetic tape, depth, width and length of the grooves 28, 28 allows to prevent the deposition of adhesive substance thereby avoiding loss in the head output, and to reduce the pad pressure thereby preventing the head abrasion. Also the present embodiment is capable, through combination of such stripe portions 29, 29 and grooves 28, 28, of effectively preventing so-called tape squeaking, an audible noise caused by stick-slip phenomenon, resulting from friction between the magnetic tape and the head.

In the following there will be explained a head smear deposition test, an abrasion test and a tape squeaking test, conducted for confirming the effects of the present embodiment.

Each test was conducted with a head of the present embodiment of the structure shown in FIG. 21, with the stripe portions of 0.1 mm high; a conventional head 1 with the grooves 28, 28 shown in FIG. 7 only; and a conventional head 2 without the grooves and the stripe portions as shown in FIG. 1.

The smear deposition test was conducted by running a magnetic tape for 20 hours on each head under a condition of 55° C. and 50% R.H. and measuring the change in the reproduced frequency characteristic caused by the tape running.

The abrasion test was conducted by running a magnetic tape for 200 hours on each head under a condition of 40° C. and 70% R.H. and measuring the abrasion after tape running with a surface coarseness meter.

In each test the measurements were made on 5 heads of the present embodiments and 5 conventional heads 1 and 2, and the average value $\bar{x}$ and the standard deviation S were determined for five measurements, as shown in the following table.

| Head | Smear deposition (DB) | | Abrasion (microns) | |
| --- | --- | --- | --- | --- |
| | $\bar{x}$ | S | $\bar{x}$ | S |
| Embodiment | −1.2 | 0.3 | 4.7 | 0.9 |
| Conventional 1 | −1.5 | 0.4 | 23.3 | 6.2 |

-continued

| Head | Smear deposition (DB) x | S | Abrasion (microns) x | S |
|---|---|---|---|---|
| Conventional 2 | −3.7 | 0.8 | 15.2 | 3.3 |

As will be apparent from the foregoing table, the magnetic head of the present embodiment shows a smaller change in the reproduced frequency characteristic and a small abrasion in comparison with the heads of the conventional structures 1 and 2, and, in particular, is different in the reproduced frequency characteristic from the conventional structure 2 and in the abrasion from the conventional structure 1. It has therefore been confirmed that the present embodiment can effectively prevent the deposition of adhesive substance and improve the abrasion resistance.

On the other hand, the tape squeaking test was conducted by running a magnetic tape under a condition of 50° C. and 50% R.H. and measuring the time from the start of tape running to the start of noise. As the result, the tape squeaking started after tape running of 28 hours or 22 hours respectively in the conventional structure 1 or 2, but was not heard in the present embodiment even after tape running of 100 hours. It has therefore been confirmed that the present embodiment can prevent the tape squeaking in extremely effective manner.

The magnetic head shown in FIG. 21 is constructed as a 4-channel auto-reverse head, so that the head itself is fixed while the magnetic tape is driven in the forward and reverse directions.

Figure 2:
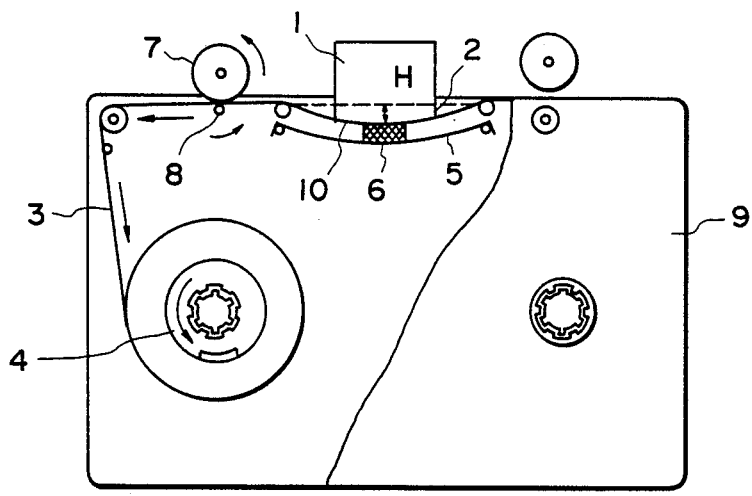
FIG. 2 is a schematic view showing a gliding contact between a magnetic head and a magnetic tape of a tape cassette.

On the other hand, in case of a 2-channel rotatable reverse head, the head itself is rotated according to the tape running direction and the magnetic tape always runs in one direction with respect to the head. In such case, as shown by a 2-channel rotatable reverse head in FIG. 2, as another embodiment of the present invention, the prevention of adhesive substance deposition can be achieved by only one groove 28 formed at the edge, at the tape entrance side, of the magnetic cores 22 on the gliding face 26.

As detailedly explained in the foregoing, the third embodiment of the present invention provides, in a magnetic head for signal recording on or playback from a magnetic tape movable relative thereto and maintained in pressure contact by a pad, a structure having a groove at least along the transversal edge of the magnetic cores at the tape entrance side and also having projecting stripe portions extended along the tape running direction and spaced from the magnetic tape with gaps thereto, for contacting the end portions of said pad to reduce the contact pressure thereof on the magnetic tape, thereby preventing the loss in the head output resulting from deposition of adhesive substance in the course of tape running, and preventing the abrasion of the magnetic head, and further preventing the tape squeaking phenomenon in effective manner.

Figure 23:
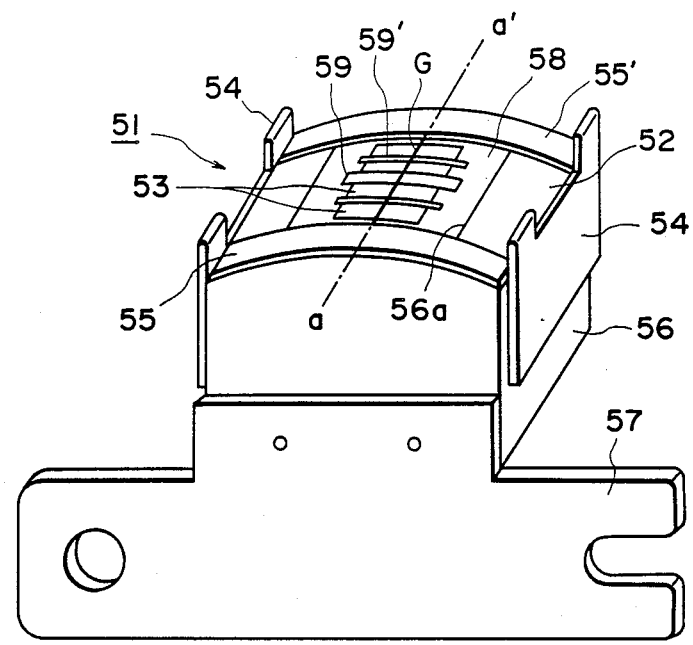
FIG. 23 is a perspective external view of a magnetic head constituting a fourth embodiment of the present invention.

Now reference is made to FIG. 23 for explaining a fourth embodiment of the present invention.

Figure 24:
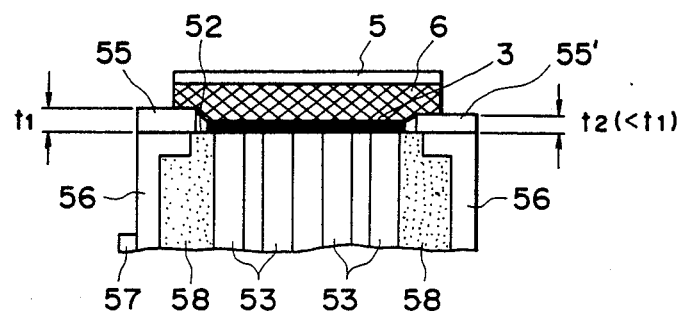
FIG. 24 is a cross-sectional view of said head along a line a—a' in FIG. 23 under pad contact.

FIGS. 23 and 24 illustrate a magnetic head for cassette tape recorder constituting the fourth embodiment, wherein FIG. 23 is a perspective external view of said head, while FIG. 24 is a cross-sectional view along a line a—a' in FIG. 23 in a state of pressure contact of a magnetic tape.

As shown in FIGS. 23 and 24, the basic structure of the head of the present embodiment is similar to the conventional structure, wherein 4-channel magnetic cores 53 have unrepresented coils and shield plates 59, 59' therebetween, and are fitted in a case 56 of the magnetic head 51 and fixed therein by a fixing material 58. Front end faces of the magnetic cores 53, with magnetic gaps G, are exposed in an aperture 56a in the upper face of the case 56, constituting a tape gliding face 52 of the head 51. On both sides of the case 56 there are fixed tape guide members 54, 54 for guiding the magnetic tape 3. The case 56 is provided with a mounting plate 57 for mounting the head 51 on an unrepresented main body of the cassette tape recorder.

In addition to the basic structure explained above, the head of the present embodiment is provided, on the gliding face 52, with a pair of projecting stripe portions 55, 55' for reducing the pad pressure by respectively contacting the end portions of the pad overflowing the lateral edges of the magnetic tape. Said stripe portions 55, 55' are composed of oblong plate members curved corresponding to the curvature of the gliding face 52, and adhered along lateral edge portions of the gliding face 52 parallel to the tape running direction.

As a feature of the present invention, as shown in FIG. 24, the height $t_1$ of a stripe portion 55 positioned at the side of the mounting plate 57, or at the side of the aforementioned socket for the capstan where the tape tension is higher in tape running, is made larger than the height $t_2$ of the other stripe portion 55' at the other side. Said stripe portions 55, 55' are separated from the lateral edges of the magnetic tape by a substantially same distance.

In the above-explained structure, since the height $t_1$ of the stripe portion 55 is larger than the height $t_2$ of the other stripe portion 55', the contact pressure of the pad 6 is reduced more significantly at the stripe portion 55 where the magnetic tape 3 has a higher tension in the transversal direction. Consequently the sum of the contact pressure of the pad 6 and the tension of the magnetic tape 3 is made uniform over the transversal direction of the tape 3, so that the resulting abrasion of the gliding face 52 is made uniform. In this manner it is rendered possible to prevent one-sided abrasion and to elongate the service life of the magnetic head.

In consideration of the tape thickness of 0.012–0.018 mm, the height $t_1$ of the stripe portion 55 is preferably maintained in a range of 0.5–0.01 mm, since a height of the stripe portions 55, 55' exceeding 0.5 mm will become unable to maintain the pad 6 in sufficient pressure contact with the gliding face 52 across the magnetic tape 3, thus resulting in a deteriorated electromagnetic conversion characteristic due to a spacing loss, while a height less than $t_1 = 0.01$ mm cannot provide a sufficient effect as a projecting stripe portion. Also in order to obtain a uniform sub of the contact pressure of the pad 6 and the tape tension over the transversal direction of the magnetic tape, the height different $t_1$-$t_2$ of the stripe portions 55, 55' is preferably maintained within a range of 0.010–0.300 mm.

The head of the present embodiment will exhibit an enhanced one-sided abrasion if the projecting stripe portions 55, 55' are interchanged in position by mistake at the assembly. In order to avoid such error at the assembly, it is important to render said stripe portions 55, 55' easily identifiable at the inspection after assembly. For this purpose the stripe portions 55, 55' are composed of mutually different materials, or are give mutually different surface treatments. For example they may be composed of materials different in the appearance such as lustre, color or surface coarseness, or in the properties such as electric resistance, hardness or different crystal states. Such difference in the appearance or in the property enables easy identifications of the stripe portions 55, 55', thus ensuring easy assembly and easy inspection.

In the present embodiment the stripe portions 55, 55' may be spaced from the magnetic tape 3 by an approximately same distance, and their positional precision is not very critical, so that the aforementioned difficulty in positioning and positional inspection of the projecting stripe portions can be avoided. Easiness of the assembly and inspection of the stripe portions explained above allows to simplify the assembling procedure of the magnetic head, thereby reducing the production cost.

As detailedly explained in the foregoing, the fourth embodiment of the present invention provides, in a magnetic head provided with a pair of projecting stripe portions for reducing the contact pressure of a pad for pressing a magnetic tape onto a gliding face on which said stripe portions are positioned, a structure in which the height from said gliding face of a stripe portion positioned closer to the mounting position (or mounting plate) of the magnetic head is made larger than that of the other stripe portion positioned farther from said mounting position, thereby preventing one-sided abrasion of the tape gliding face, thus elongating the service life of the magnetic head, and simplifying the assembling process of the magnetic head, thus reducing the production cost thereof.

Figure 25:
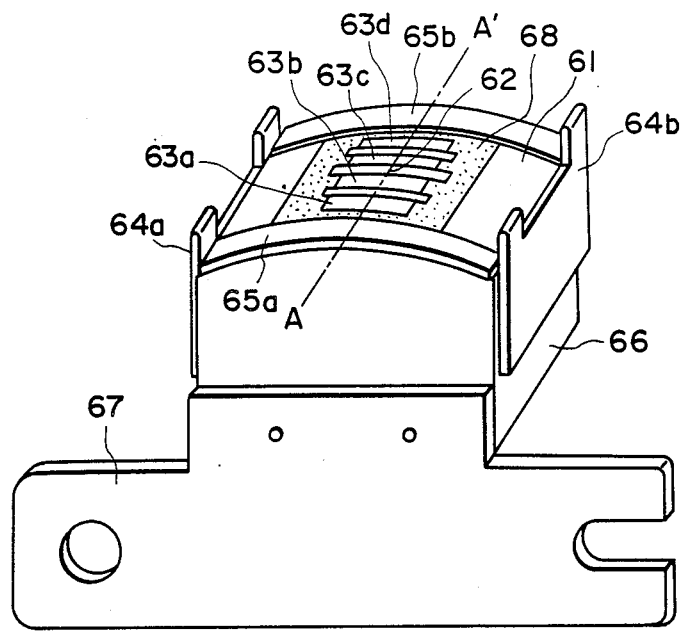
FIG. 25 is a perspective external view of a magnetic head constituting a fifth embodiment of the present invention.

FIG. 25 is a perspective view of a fixed magnetic head constituting a fifth embodiment of the present invention, provided with projecting stripe portions 65a, 65b.

In the fixed magnetic head shown in FIG. 25, magnetic cores 63a, 63b, 63c, 63d having magnetic gaps 62 are exposed in a gliding face 61, and the gliding direction of a magnetic tape 3 on the gliding face 61 is restricted by tape guide members 64a, 64b. On the gliding face 61 there are provided a pair of projecting stripe portions 65a, 65b along the running direction of the magnetic tape 3, in positions not touching said tape 3, and a head case 66 is provided with a mounting plate for mounting on a cassette tape recorder.

Figure 26:
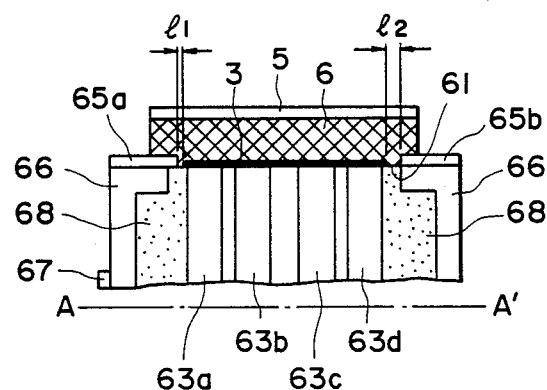
FIG. 26 is a cross-sectional view of said head along a line A—A' in FIG. 25 under pad contact.

FIG. 26 is a cross sectional view of said magnetic head along a line A—A' in FIG. 25, wherein same components as those in FIG. 25 are represented by same numbers.

FIG. 26 shows that the magnetic tape 3 is maintain in pressure contact with the gliding face 61 by means of a pad spring 5 and a pad 6. The paired projecting stripe portions 65a, 65b are separated from the tape 3 on the gliding face 61 by gaps $l_1$, $l_2$.

Figure 9:
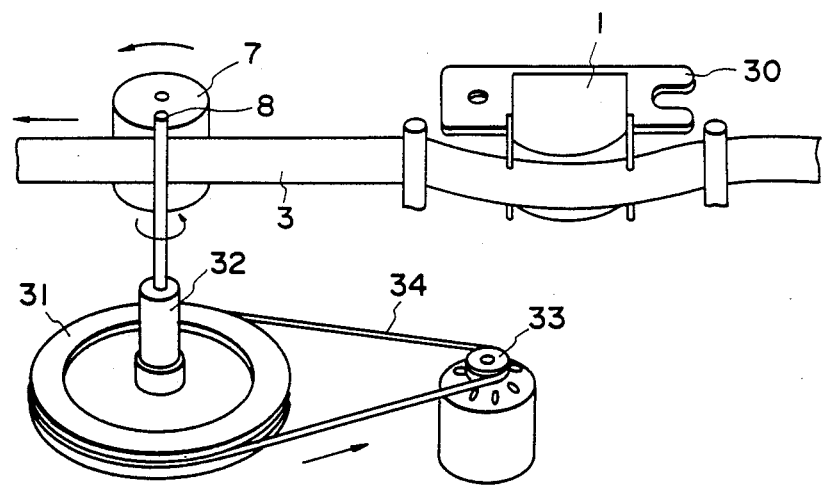
FIG. 9 is a schematic view of a capstan and related mechanisms in FIG. 2.

The projecting stripe portions 65a, 65b provided on the gliding face 61 had a thickness of 0.1 mm, and the head mounting position was so determined that the stripe portion 65a closer to the socket 32 for the capstan 8 (FIG. 9) was spaced from the magnetic tape 3 by a gap $l_1=0.05$ mm while the other stripe portion 65b was spaced by a gap $l_2=0.10$ mm. A tape cassette, shown in FIG. 9, was mounted on a cassette tape recorder having said magnetic head provided with the stripe portions 65a, 65b, and the form of abrasion of the gliding face 61 was examined after tape running up to 500 hours under a condition of 40° C. and 70–75% R.H.

Figure 3:
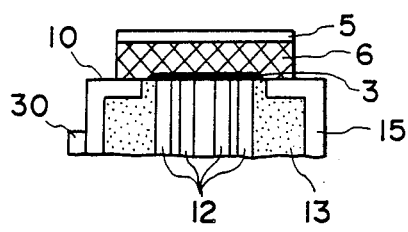
FIG. 3 is a cross-sectional view along a line a—a' in FIG. 1 in a state where a magnetic tape is pressed against the magnetic head.
Figure 27:
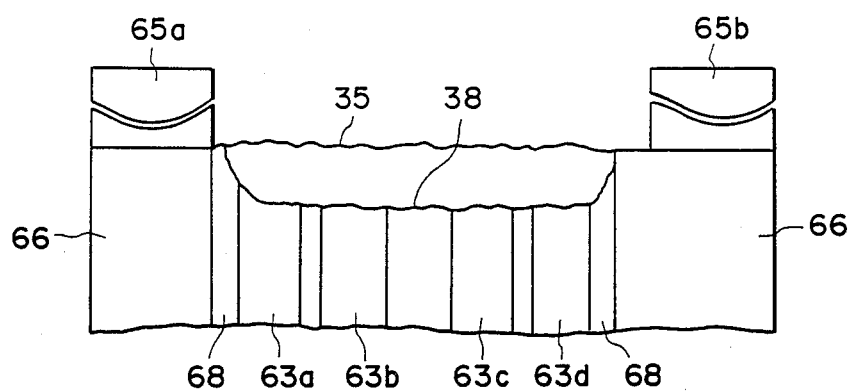
FIG. 27 is a cross-sectional view of the magnetic head of the fifth embodiment after an abrasion test for 500 hours.
Figure 28:
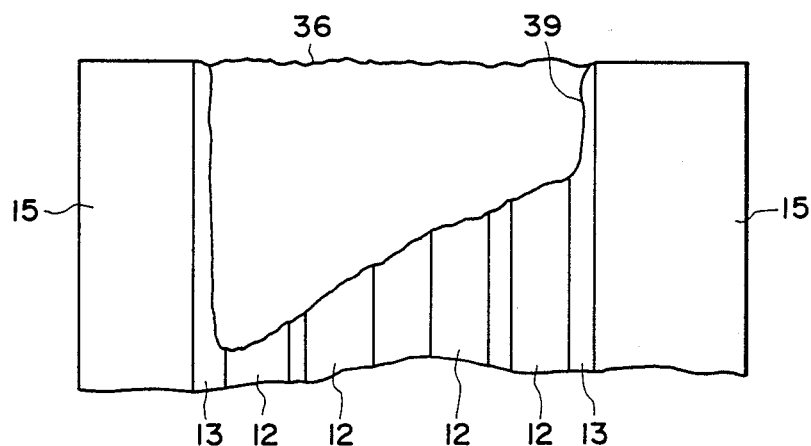
FIG. 28 is a cross-sectional view of a conventional magnetic head shown in FIG. 1 after an abrasion test for 500 hours.
Figure 29:
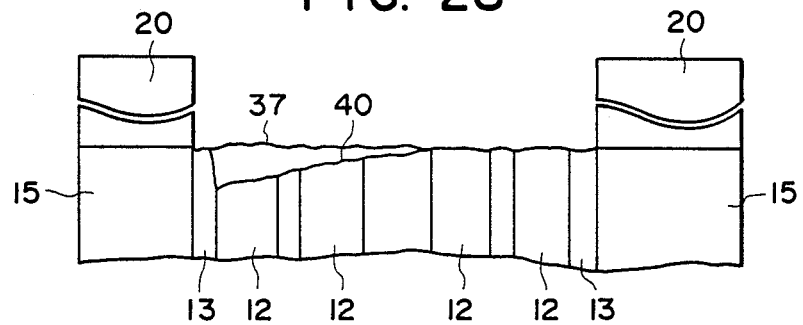
FIG. 29 is a cross-sectional view of a conventional magnetic head shown in FIG. 6, after an abrasion test for 500 hours without the pad pressure by the pad spring incorporated in the tape cassette.

FIGS. 27, 28 and 29 show the forms of abrasion of the gliding face 61 after said tests. FIG. 27 is a partial cross-sectional view of a fixed magnetic head of the fifth embodiment shown in FIGS. 25 and 26, while FIG. 28 is a similar cross-sectional view of a conventional fixed magnetic head shown in FIGS. 1 and 3, and FIG. 29 is a similar cross-sectional view of a fixed magnetic head in which the tape was made to glide without the contact pressure of the pad 6 under the influence of the pad spring 5. In FIGS. 27, 28 and 29, curves 35, 36 and 37 indicate the state of the gliding face 61 or 10 prior to the tape running, while curves 38, 39 and 40 indicate the abraded gliding face after tape running of 500 hours.

Since the gliding face 10 of the magnetic head shows an abraded form 40 in the absence of the pressure of the pad 6 by the pad spring 5 as shown in FIGS. 6 and 29, it is evident that the tape tension has a significant contribution on the abrasion of the gliding face. If the contact pressure of the pad 6, caused by the pad spring 5, is remove from the tape 3 gliding on the gliding face 10 of the magnetic head, the abrasion of the gliding face 10 is reduced, but a spacing is formed between said gliding face 10 and the tape 3, thus significantly deteriorating the electromagnetic conversion characteristics. Consequently, as shown in FIGS. 25 to 27, the thickness of the pad 6 should be so selected that the pad 6 shows sufficient deformation under the elastic force of the pad spring 5 to maintain the tape 3 in pressure contact with the gliding face 61, and should generally be less than ca. 0.6 mm.

Also the distance $l_1$ (FIG. 26) from the stripe portion 65a closer to the socket 32 (FIG. 9) to a lateral edge of the magnetic tape 3 should be at least ¼ of the thickness of said stripe portion 65a, since otherwise the pad 6 cannot show sufficient deformation under the elastic force of the pad spring 5, whereby the pad 6 cannot contact a core 63a closest to the stripe portion 65a to form a spacing between the gliding face 61 and the tape 3, thus deteriorating the electromagnetic conversion characteristics.

Also the distance $l_2$ from the stripe portion 65b farther from the socket 32 to a lateral edge of the tape 3 should be larger than the distance $l_1$ from the stripe portion 65a closer to the socket 32, preferably in a range of $l_2=1.1l_1-5l_1$ in consideration of the form of abrasion of the gliding face 61.

In addition the distances $l_1$, $l_2$ from the stripe portions 65a, 65b to the lateral edges of the tape 3 should preferably be so determined that the sum thereof with the width (3.82 mm) of the tape guide members 64a, 64b does not exceed 4.7 mm, since otherwise the pad 6, having a width of 5 mm or larger according to the IEC JAPAN standards, will not engage with the stripe portions 65a, 65b if it becomes broken.

In the foregoing explanation, the magnetic head of the fifth embodiment is assumed to have a mounting plate at a side closer to the flywheel or capstan socket of the tape driving system. However, if the mounting plate of the magnetic head is provided at the opposite side, the distance from the projecting stripe portion on the gliding face to the lateral edge of the tape should naturally be made smaller at a side closer to said socket and larger at the opposite side.

The fifth embodiment has been explained by a fixed magnetic head having four magnetic cores, but it is naturally applicable to a fixed magnetic head utilizing a whole-width magnetic head or 2-channel magnetic heads.

As detailedly explained in the foregoing, the fifth embodiment of the present invention provides a structure of magnetic head provided with a pair of projecting stripe portions on both sides of the running position of the magnetic tape, in which the distance from a stripe portion positioned closer to the mounting portion of the magnetic head to a lateral edge of the magnetic tape is made smaller than the distance from the other stripe portion positioned farther to said mounting portion to the other lateral edge of the magnetic tape, thereby achieving uniform abrasions, caused by the magnetic tape running, over the different magnetic cores and significantly reducing the amount of abrasion, thus obtaining a longer service life.

We claim:

1. A magnetic head, comprising:
a magnetic core having a first contact face for contacting a recording medium;
a fixing material surrounding said magnetic core and having a second contact face for contacting the recording medium; and
a case housing said magnetic core and said fixing material, provided with an aperture exposing said first contact face of said magnetic core and said second contact face of said fixing material and provided further with a pair of projecting members, each of said projecting members projecting from a position adjacent said aperture and outside a path of the recording medium,
wherein said projecting members on said case project from at least one of said first contact face of said magnetic core and said second contact face of said fixing material a distance which is within a range of 0.01 mm to 0.5 mm.

2. A magnetic head, comprising:
a magnetic core having a first contact face for contacting a recording medium;
a fixing material surrounding said magnetic core having a second contact face for contacting the recording medium; and
a case housing said magnetic core and said fixing material, provided with an aperture exposing said first contact face of said magnetic core and said second contact face of said fixing material and provided further with a pair of projecting members, each of said pair of projecting members having first and second portions, each of said first portions projecting from a position adjacent said aperture and outside a path of the recording medium, said second portions being positioned further from said aperture than are said first portions,
wherein each of said projecting members is provided with a face inclined downward toward said aperture such that each of said first portions has a height in a range of 0.01 mm to 0.1 mm and each of said second portions has a height larger than 0.1 mm.

3. A magnetic head, comprising:
a magnetic core having a first contact face for contacting a recording medium;
a fixing material surrounding said magnetic core and having a second contact face for contacting the recording medium;
a case housing said magnetic core and said fixing material, provided with an aperture exposing said first contact face of said magnetic core and said second contact face of said fixing material and provided further with a pair of projecting members, each of said pair of projecting members projecting from a position adjacent said aperture and outside a path of the recording medium; and
at least one groove formed by cutting at least said case along a lateral edge thereof a side where the recording medium enters said case in a direction substantially perpendicular to the running direction of the recording medium.

4. A magnetic head according to claim 3, comprising two grooves at positions sandwiching said first contact face of said magnetic care.

5. A magnetic head according to claim 3, wherein said at least one groove is formed in a position not interrupting the projecting members provided on said case.

6. A magnetic head according to claim 4, wherein said at least one groove is formed in a position not interrupting the projecting members provided on said case.

7. A magnetic head, comprising:
a magnetic core having a first contact face for contacting a recording medium;
a fixing material surrounding said magnetic core and having a second contact face for contacting the recording medium;
a case housing said magnetic core and said fixing material, provided with an aperture exposing said first contact face of said magnetic core and said second contact face of said fixing material and provided further with a pair of projecting members, each of said projecting members projecting from a position adjacent said aperture and outside a path of the recording medium; and
mounting means for mounting said case on another apparatus;
wherein the height of one of said pair of projecting members on said case, closer to said mounting means, is larger by an amount ranging from 0.01 mm to 0.3 mm than the height of the other projecting member.

8. A magnetic head, comprising:
a magnetic core having a first contact face for contacting a recording medium;
a fixing material surrounding said magnetic core and having a second contact face for contacting the recording medium;
a case housing said magnetic core and said fixing material, provided with an aperture exposing said first contact face of said magnetic core and said second contact face of said fixing material and provided further with a pair of projecting members, each of said projecting members projecting from a position adjacent said aperture and outside a path of the recording medium;
mounting means for mounting said case on another apparatus; and
tape guide members provided on lateral faces of said case, for guiding the recording medium to a position closer to one of said pair of projecting members, which is positioned closer to said mounting means than the other of said pair of projecting members, than a central position between said pair of projecting members on said case.

9. A magnetic head according to claim 8, wherein said tape guide members are so positioned that a quantity $l_2$ is in a range of $1.1 l_1$ to $5 l_1$, where $l_1$ is the distance from a lateral edge of the recording medium to one of said pair of projecting members and $l_2$ is the distance from the other lateral edge of the recording medium to the other of said pair of projecting members.

10. An apparatus utilizing a magnetic head, comprising:

a magnetic head capable of electromagnetic conversion; and a loading means for loading a cassette, the cassette including (i) a recording medium to be maintained in gliding contact with said magnetic head and (ii) a pad for maintaining the recording medium in pressure contact with said magnetic head, wherein said magnetic head is provided with a pair of projecting members fixedly mounted to said magnetic head and adapted to contact the pad incorporated in the cassette in plural positions thereby reducing the contact pressure of the pad while maintaining a sufficient contact pressure for pressing the recording medium.

11. An apparatus according to claim 10, wherein said pair of projecting members formed on said magnetic head project a distance which is in a range from 0.01 mm to 0.5 mm.

12. An apparatus according to claim 10, wherein said pair of projecting members formed on said magnetic head including upper end faces mutually inclined inwards.

13. An apparatus utilizing a magnetic head, comprising:

a magnetic head capable of electromagnetic conversion;

a maintaining means for maintaining a recording medium in gliding contact with said magnetic head and adapted to be used with a pad incorporated in a cassette for maintaining the recording medium in pressure contact with said magnetic head, said maintaining means being provided with a socket for a capstan for conveying the recording medium;

pressure reducing means for reducing the contact pressure on the recording medium exerted by the pad incorporated in the cassette, by an increasing degree at a position on said magnetic head closer to said socket.

14. An apparatus according to claim 13, wherein said pressure reducing means is composed of a pair of projecting members, each of said pair of projecting members projecting from the front face of said magnetic head, for engaging with the pad incorporated in the cassette.

15. An apparatus according to claim 14, wherein the distance said projecting members project is larger at a position closer to said socket of said apparatus and smaller at a position farther from said socket.

16. An apparatus according to claim 14, wherein said pressure reducing means further comprising tape guide members formed on lateral faces of said magnetic head for guiding the recording medium incorporated in the cassette to a position closer to one of said projecting positioned closer to said socket of said apparatus.

* * * * *

UNITED STATES PATENT AND TRADEMARK OFFICE
CERTIFICATE OF CORRECTION

PATENT NO. : 4,894,737

DATED : January 16, 1990

INVENTOR(S) : Junji Hamana, et al.

It is certified that error appears in the above-identified patent and that said Letters Patent is hereby corrected as shown below:

ON THE COVER SHEET

ASSIGNEE

"Canon Kabushiki Kaisha, Tokyo, Japan" should read --Canon Denshi Kabushiki Kaisha, Chichibu-shi, Saitama-ken, Japan--.

ABSTRACT

Line 14, "head" should read --the head--.
Line 19, "portion" should read --portions--.

IN THE DISCLOSURE

COLUMN 1

Line 55, "cross sectional" should read --corss-sectional--.
Line 64, "right-hand slide" should read --right-hand side--.

COLUMN 2

Line 18, "requested" should read --desirable--.
Line 20, "magnetic tape 1," should read --magnetic head 1,--.

UNITED STATES PATENT AND TRADEMARK OFFICE
CERTIFICATE OF CORRECTION

PATENT NO. : 4,894,737

DATED : January 16, 1990

INVENTOR(S) : Junji Hamana, et al.

It is certified that error appears in the above-identified patent and that said Letters Patent is hereby corrected as shown below:

COLUMN 3

Line 33, "indicing" should read --inducing--.

COLUMN 4

Line 11, "black-" should read --play- --.
    Line 57, "drawbacks," should read --drawback,--.

COLUMN 6

Line 55, "contacts" should read --contact--.
    Line 59, "presses" should read --press--.

COLUMN 11

Line 68, "high" should read --low--.

COLUMN 14

Line 56, "height different" should read --height difference--.
    Line 66, "give" should read --given--.

COLUMN 15

Line 45, "cross sectional" should read --cross-sectional--.
    Line 49, "maintain" should read --maintained--.

UNITED STATES PATENT AND TRADEMARK OFFICE
CERTIFICATE OF CORRECTION

PATENT NO. : 4,894,737
DATED : Jaunary 16, 1990
INVENTOR(S) : Junji Hamana, et al.

It is certified that error appears in the above-identified patent and that said Letters Patent is hereby corrected as shown below:

COLUMN 17

Line 6, "farther to" should read --farther from--.

COLUMN 18

Line 2, "thereof a" should read --thereof at a--.
Line 8, "magnetic care." should read --magnetic core.--.

COLUMN 19

Line 21, "including" should read --include--.

COLUMN 20

Line 12, "is composed" should read --comprises--.
Line 23, "comprising" should read --comprise--.
Line 26, "projecting" should read --projecting members--.

Signed and Sealed this

Eighth Day of October, 1991

Attest:

HARRY F. MANBECK, JR.

Attesting Officer          Commissioner of Patents and Trademarks